(12) United States Patent
Golden et al.

(10) Patent No.: US 11,199,206 B2
(45) Date of Patent: *Dec. 14, 2021

(54) INSULATING SLEEVE

(71) Applicant: BITZER Kuehlmaschinenbau GmbH, Sindelfingen (DE)

(72) Inventors: Duane M. Golden, Hastings, NY (US); Kurt William Robert Bessel, Mexico, NY (US)

(73) Assignee: BITZER Kuehlmaschinenbau GmbH, Sindelfingen (DE)

(*) Notice: Subject to any disclaimer, the term of this patent is extended or adjusted under 35 U.S.C. 154(b) by 58 days.

This patent is subject to a terminal disclaimer.

(21) Appl. No.: 16/525,236

(22) Filed: Jul. 29, 2019

(65) Prior Publication Data

US 2019/0353188 A1 Nov. 21, 2019

Related U.S. Application Data

(63) Continuation of application No. 15/084,065, filed on Mar. 29, 2016, now Pat. No. 10,415,609.

(51) Int. Cl.
*F16B 2/08* (2006.01)
*F16B 2/06* (2006.01)
(Continued)

(52) U.S. Cl.
CPC ............. *F16B 2/08* (2013.01); *F16B 2/065* (2013.01); *F16B 2/10* (2013.01); *F16B 2/22* (2013.01);
(Continued)

(58) Field of Classification Search
CPC ... G01K 1/14; F16B 2/065; F16B 2/08; F16B 2/10; F16M 13/022
(Continued)

(56) References Cited

U.S. PATENT DOCUMENTS 3,022,478 A ‡ 2/1962 Fish .................. G01K 1/143
338/31
3,916,489 A ‡ 11/1975 Berger .................. F16B 2/08
138/99

(Continued)

FOREIGN PATENT DOCUMENTS

CN 105402129 3/2016
CN 104197205 5/2016
(Continued)

*Primary Examiner* — Craig M Schneider
*Assistant Examiner* — David R Deal
(74) *Attorney, Agent, or Firm* — Reinhart Boerner Van Deuren P.C.

(57) ABSTRACT

A thermally insulating sleeve for a compressor discharge pipe is provided. The insulating sleeve includes a non-metallic first half-sleeve having a first curved body portion and a first extended portion. The first curved body portion is configured to fit at least partially around a portion of the compressor discharge pipe. A non-metallic second half-sleeve has a second curved body portion configured to attach to the first curved body portion such that the first and second curved body portions completely encircle the portion of the compressor discharge pipe. The second half-sleeve includes a second extended portion configured to attach to the first extended portion. Each of the first and second extended portions include respective first and second cavities which, together, encase a temperature sensor in contact with, or in spaced relation to, the compressor discharge pipe.

22 Claims, 7 Drawing Sheets

(51) Int. Cl.
*F16B 2/10* (2006.01)
*F16M 13/02* (2006.01)
*G01K 1/143* (2021.01)
*F16B 2/22* (2006.01)
*F16L 55/07* (2006.01)
*F16L 3/10* (2006.01)
*F16L 3/13* (2006.01)

(52) U.S. Cl.
CPC ............ *F16L 55/07* (2013.01); *F16M 13/022* (2013.01); *G01K 1/143* (2013.01); *F16L 3/105* (2013.01); *F16L 3/1075* (2013.01); *F16L 3/1091* (2013.01); *F16L 3/13* (2013.01)

(58) Field of Classification Search
USPC .... 138/149, 106, 110, 104, 103, 156, 97, 99
See application file for complete search history.

(56) References Cited

U.S. PATENT DOCUMENTS

| | | | |
|---|---|---|---|
| 4,119,285 A | 10/1978 | Bisping et al. | |
| 4,297,668 A | 10/1981 | Place | |
| 4,386,752 A | 6/1983 | Pavlak et al. | |
| 4,966,397 A | 10/1990 | McKinnon | |
| 5,251,857 A | 10/1993 | Grice et al. | |
| 5,598,995 A ‡ | 2/1997 | Meuth | E21B 17/1035 24/273 |
| 6,334,707 B1 | 1/2002 | Ku | |
| 6,550,962 B1 ‡ | 4/2003 | Yang | F16L 3/04 24/458 |
| 7,390,951 B2 ‡ | 6/2008 | Dulaney | G10G 7/02 84/454 |
| 7,821,411 B1 ‡ | 10/2010 | Ward | G01F 23/268 340/61 |
| 8,151,651 B1 ‡ | 4/2012 | Feller | G01F 1/662 73/861 |
| 10,415,609 B2 * | 9/2019 | Golden | G01K 1/143 |
| 2004/0028118 A1 ‡ | 2/2004 | Sidoni | G01K 1/143 374/208 |
| 2004/0165648 A1 ‡ | 8/2004 | Ikeda | G01K 1/14 374/208 |
| 2006/0070662 A1 ‡ | 4/2006 | Gremillion, III | F16K 27/12 137/382 |
| 2009/0152419 A1 ‡ | 6/2009 | Wallace | A63B 63/004 248/219.4 |
| 2010/0177802 A1 ‡ | 7/2010 | Weyna | F25D 29/005 374/20 |
| 2013/0327412 A1 ‡ | 12/2013 | DeGeorge | B23P 11/00 137/15.01 |

FOREIGN PATENT DOCUMENTS

| | | | | |
|---|---|---|---|---|
| DE | 10 2012 108388 | 3/2014 | | |
| EP | 0 834 727 | 4/1998 | | |
| EP | 0908711 A1 ‡ | 4/1999 | ............. | G01K 1/143 |
| EP | 0908711 A1 | 4/1999 | | |
| FR | 70048 | 9/1956 | | |
| FR | 1126581 | 2/1959 | | |
| FR | 2 252 566 | 6/1975 | | |
| JP | 2004 340625 | 12/2004 | | |

\* cited by examiner
‡ imported from a related application

INSULATING SLEEVE

CROSS-REFERENCE TO RELATED PATENT APPLICATION

This patent application is a continuation of co-pending U.S. patent application Ser. No. 15/084,065, filed Mar. 29, 2016, which is currently pending, the entire teachings and disclosure of which are incorporated herein by reference thereto.

FIELD OF THE INVENTION

This invention generally relates to a thermally insulating sleeve for a compressor discharge pipe.

BACKGROUND OF THE INVENTION

Some conventional compressors have temperature sensors to measure the temperature of a discharge pipe. In certain cases, the temperature sensor may be fastened to the discharge pipe using a modified pipe clamp, for example, which is taped to the discharge pipe with insulating tape. In some cases, the tape is then strapped, using cable ties, on both sides of the temperature sensor to keep the tape from unraveling.

The problem with conventional arrangements, such as the one described above, is that the pipe clamp, insulating tape, and cable ties are difficult to assemble, more difficult to disassemble, and, if not installed correctly, may be ineffective at applying adequate contact force between the temperature sensing surface and the discharge pipe, and therefore may not thermally insulate the temperature sensor sufficiently from its environment. It would be desirable to have a thermally insulating sleeve that addresses some of the aforementioned problems.

Embodiments of the present invention provide such a thermally insulating sleeve. These and other advantages of the invention, as well as additional inventive features, will be apparent from the description of the invention provided herein.

BRIEF SUMMARY OF THE INVENTION

In one aspect, embodiments of the invention provide a thermally insulating sleeve for a compressor discharge pipe. The insulating sleeve includes a non-metallic first half-sleeve having a first curved body portion and a first extended portion. The first curved body portion is configured to fit at least partially around a portion of the compressor discharge pipe. A non-metallic second half-sleeve has a second curved body portion configured to attach to the first curved body portion such that the first and second curved body portions completely encircle the portion of the compressor discharge pipe. The non-metallic second half-sleeve includes a second extended portion configured to attach to the first extended portion. Each of the first and second extended portions include respective first and second cavities which, together, encase a temperature sensor in contact with, or in spaced relation to, the compressor discharge pipe.

In a particular embodiment, the first and second half-sleeves are each constructed from molded plastic. Further, in certain embodiments, the first and second half-sleeves are attached using one or more mechanical fasteners. The one or more mechanical fasteners may include a threaded screw.

In certain embodiments, the first half-sleeve has an opening at each of the first and second ends. Each opening is configured for the insertion of a screw therethrough. The second half-sleeve has a threaded opening at each of the first and second ends. Each opening is configured to receive a threaded portion of the screw. At least one of the first and second extended portions includes at least a partial opening for a wire connected to the temperature sensor. The at least partial opening provides a path from its respective cavity to an exterior of the first or second half-sleeve. Also, at least one of the first and second extended portions includes an opening for a wire connected to the temperature sensor.

In another aspect, embodiments of the invention provide a thermally insulating sleeve for a compressor discharge pipe, the insulating sleeve having a non-metallic second body portion configured to fit at least partially around a first portion of the compressor discharge pipe, and a non-metallic first portion configured to fit at least partially around a second portion of the compressor discharge pipe different from the first portion of the compressor discharge pipe. The first portion is further configured to be removably attached to the second body portion to secure the insulating sleeve to the discharge pipe such that the second body portion and first portion completely encircle the portion of the compressor discharge pipe. The second body portion includes an extended portion with a cavity configured to encase a temperature sensor in contact with, or in spaced relation to, the compressor discharge pipe.

In certain embodiments, an attachment mechanism for the first portion and second body portion includes a first portion comprising a cable strap pivotably attached to the second body portion. The cable strap may wrap around a portion of the discharge pipe to secure the compressor discharge pipe to the second body portion. In a different embodiment, the first portion and second body portion are attached at a pivot point such that the first portion pivots about the pivot point between an open position, in which the insulating sleeve can be attached or removed from the discharge pipe, and a closed position in which the first portion and second body portion are fastened to the compressor discharge pipe. In a more particular embodiment, the first portion includes a flexible clip that engages a flange on the second body portion to secure the first portion to the second body portion at the connection point when in the closed position.

In a further embodiment, the first portion is a separate member from the second body portion. The first portion and second body portion are configured to be attached via one or more posts, each of which is inserted through a corresponding hole in a flange of the lower body portion, and secured via an "E" spring clip, which is fastened to a groove encircling its respective post. Further, the first portion may be a separate member from the second body portion, where the first portion and second body portion are configured to be attached via one or more push on clips. The push on clip may be configured to slide over mating flanges of the first portion and second body portion.

In some embodiments, the first portion has a threaded opening to receive a tension screw, and the second body portion has two arms that extend to opposite sides of the compressor discharge pipe. The second body portion has a pin at the end of each of the two arms. The first portion has two curved ends, each configure to wrap around one of the pins such that rotation of the tension screw in a first direction tightens the attachment between the first portion and second body portion, and rotation of the tension screw in a second direction opposite the first direction loosens the attachment between the first portion and second body portion.

In a particular embodiment, the first portion has a threaded opening to receive a tension screw, and the second body portion has two arms that extend to opposite sides of the compressor discharge pipe. The second body portion has a first hook at the end of each of the two arms, and the first portion has, at each end, a second hook configured to interlock with the first hook. In this embodiment, rotation of the tension screw in a first direction tightens the attachment between the first portion and second body portion, and rotation of the tension screw in a second direction opposite the first direction loosens the attachment between the first portion and second body portion.

In a particular embodiment, an attachment mechanism for the first portion and second body portion includes a cotter pin pivotably attached to the second body portion. The cotter pin may close around a portion of the discharge pipe such that a latch on the second body portion secures the compressor discharge pipe to the second body portion. In other embodiments, the first portion includes a pipe clamp having a screw assembly and a band which is wrapped around a portion of the discharge pipe. The band is tightened or loosened by rotation of a screw in the screw assembly.

In yet another aspect, embodiments of the invention provide a thermally insulating sleeve for a compressor discharge pipe. The insulating sleeve has a non-metallic body portion configured to fit at least partially around a segment of the compressor discharge pipe. The body portion has a first resilient flexible curved arm and a second resilient flexible curved arm. The first and second resilient flexible arms extend from opposite sides of the body portion. The first resilient flexible curved arm has a first end, and the second resilient flexible curved arm has a second end. The first and second resilient flexible curved arm have a normal position in which the first and second ends are separated by a distance that is less than a diameter of the compressor discharge pipe. The first and second resilient flexible curved arms are configured to bend so that the distance between the first and second ends is greater than the diameter of the compressor discharge pipe to facilitate insertion or removal of the compressor discharge pipe from the insulating sleeve. After the insertion or removal of the compressor discharge pipe, the first and second resilient flexible curved arms return to the normal position.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Figure 1:
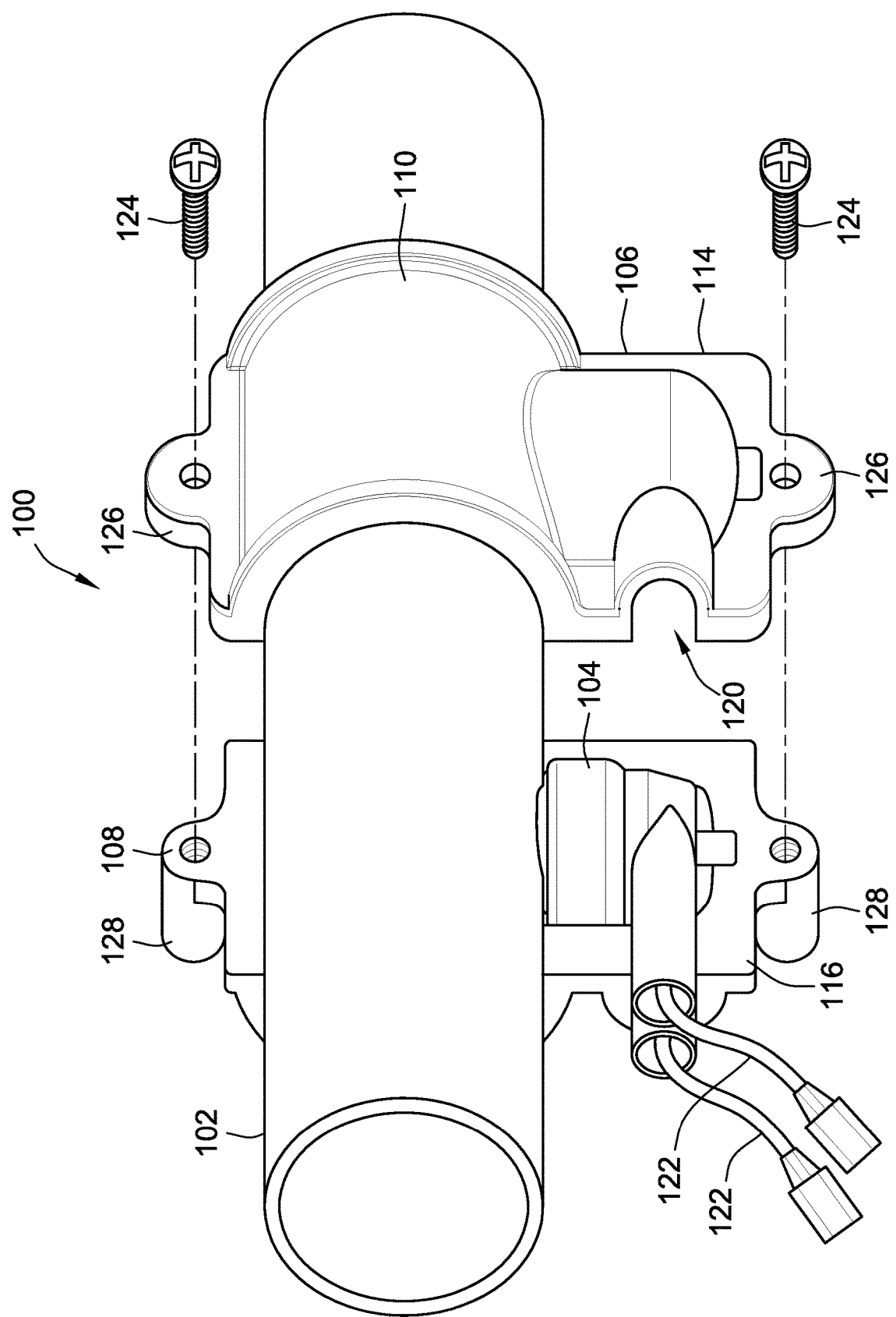
FIG. 1 is a perspective view of a thermally insulating sleeve for a compressor discharge pipe, according to an embodiment of the invention.
Figure 2A:
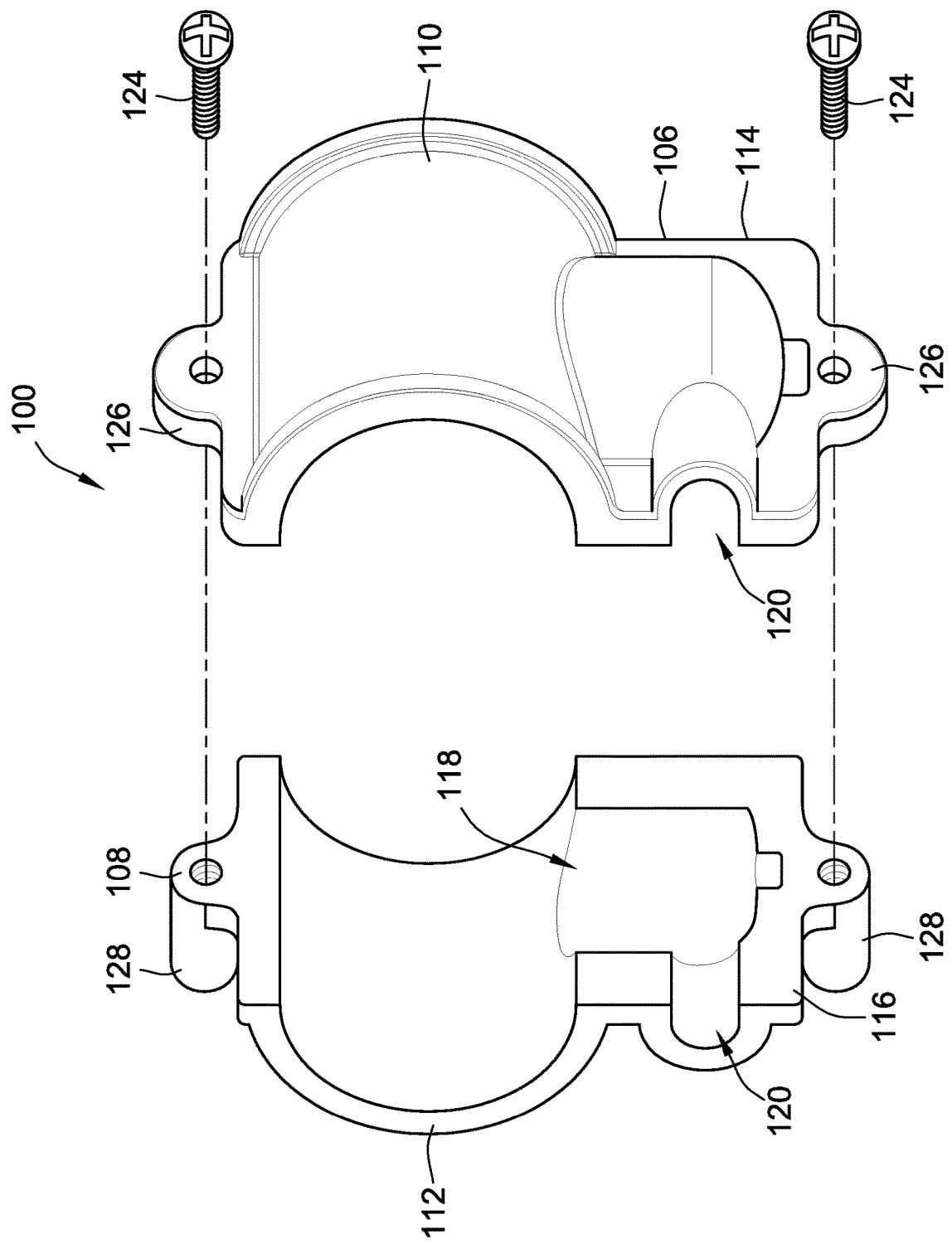
FIG. 2A is a perspective view of the first and second halves of the insulating sleeve in FIG. 1.

FIGS. 1 and 2A show perspective views of an insulating sleeve 100 for a compressor discharge pipe 102, according to an embodiment of the invention. The insulating sleeve 100 serves to protect, insulate, and secure a discharge gas temperature sensor 104 to the discharge pipe 102 of a compressor (not shown). In a particular embodiment, such as shown in FIG. 1, the insulating sleeve 100 includes a first half-sleeve 106 and a second half sleeve 108.

The first half-sleeve 106 includes a first curved body portion 110, while the second half-sleeve 108 includes a second curved body portion 112. Additionally, the first half-sleeve 106 includes a first extended portion 114, while the second half-sleeve 108 includes a second extended portion 116. Each of the first and second extended portions 114, 116 includes a cavity 118 configured to receive at least a portion of the discharge gas temperature sensor 104.

Typically, the discharge gas temperature sensor 104 is sized small enough to easily fit within the insulating sleeve 100, and may have a variety of mounting options. Typically, the thermal response of the discharge gas temperature sensor 104 makes it suitable for use as a temperature control device with, for example, dehumidifiers, freezers, heat pumps, ice makers, refrigerators, or in other similar applications where a fixed temperature control device is required.

Additionally, such discharge gas temperature sensors 104 are applied to monitor the compressor output, as excessive discharge gas temperature is often indicative of imminent failure of the compressor or the overall system. Such sensors may be employed by control systems to shut down compressors, preventing potentially dangerous and costly further failure.

The first half-sleeve 106 and second half-sleeve 108 are configured to be attached such that the first curved body portion 110 and second curved body portion 112 completely encircle the discharge pipe 102. At the same time, the first extended portion 114 and the second extended portion 116 encase the discharge gas temperature sensor 104.

In particular embodiments of the invention, the first and second extended portions 114, 116 each include at least a portion of an opening 120. When the first and second half-sleeves are attached, the at least a portion of an opening 120 of the first and second extended portions 114, 116 may cooperate to form one complete opening, or may form two separate openings. The openings are to accommodate electrical wires 122 that connect to the discharge gas temperature sensor 104.

In particular embodiments, the first half-sleeve 106 and second half-sleeve 108 are attached using mechanical fasteners. In the embodiment of FIG. 1, two threaded screws 124 are used to attach the first and second half-sleeves 106, 108 at top and bottom ends thereof. In the embodiment shown, the first half-sleeve 106 has a projection 126 with an opening at the top and bottom ends. Each opening allows for the insertion of the threaded screw 124 through the opening. The second half-sleeve 108 has a corresponding projection 128 with a threaded opening the top and bottom ends. Each threaded opening is configured to receive the threaded portion of the threaded screw 124. In an alternate embodiment, the projections 128 are not threaded. Unthreaded projections are less costly to manufacture in that they require no additional manufacturing operation to create the threads. In this case, the screws 124 are self-tapping.

It is envisioned that the first and second half-sleeves 106, 108 are made from molded plastic, for example using injection molding. It is also possible that other suitable materials could be used to construct the first and second half-sleeves 106, 108. It is also possible the first and second half-sleeves 106, 108 could be machined from various metal or non-metal materials. In this embodiment, and in the embodiments described below where two pieces are clamped together around the discharge pipe 102, it is typical to have a slight gap between the flanges used to attach the two pieces. This ensures that the tight clamping force is between the circular or semi-circular portions of the two pieces and the discharge pipe 102, rather than between the flanges, which could result in some undesired clearance between the circular or semi-circular portions and the discharge pipe 102.

Figure 2B:
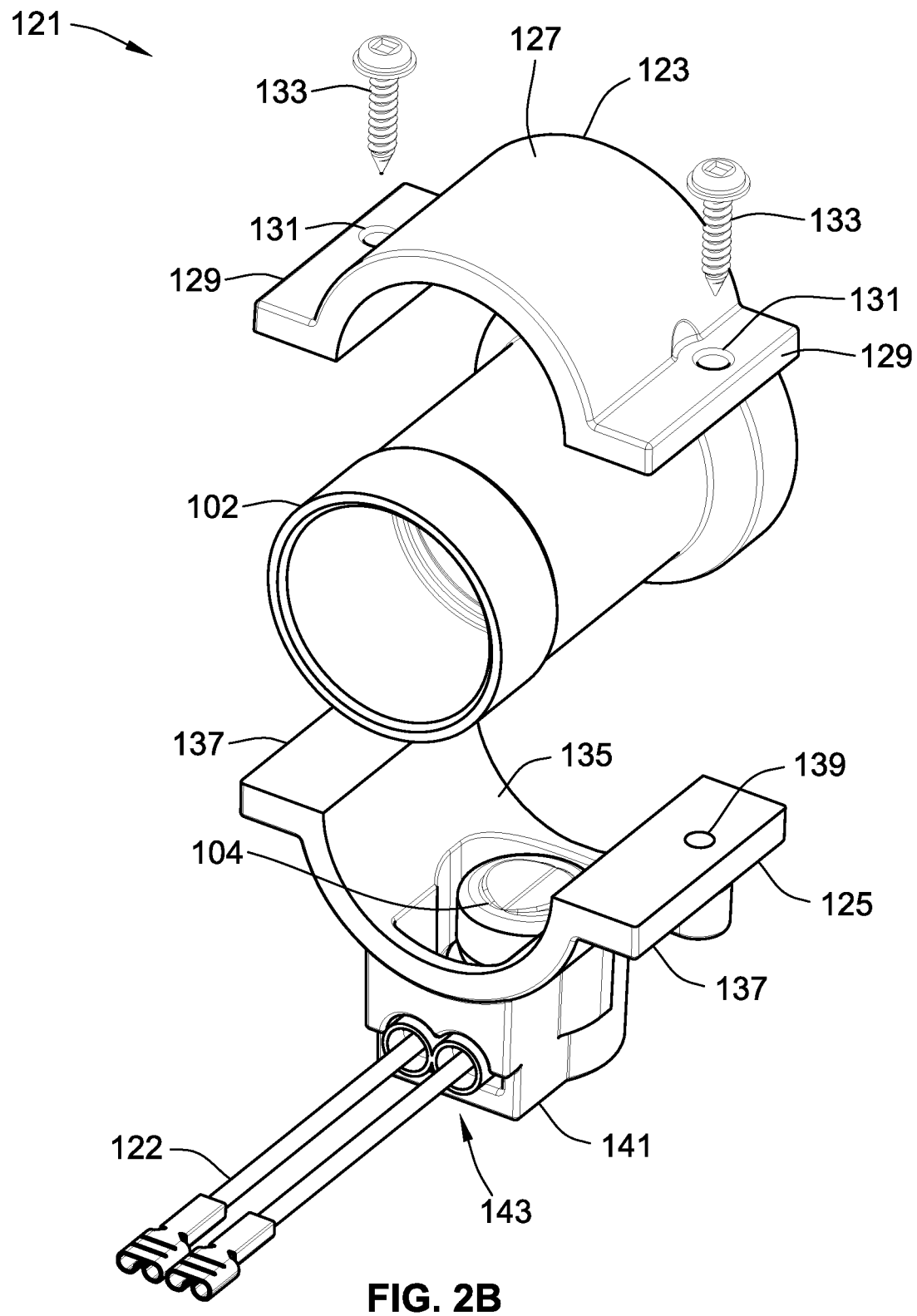
FIG. 2B is a perspective view of an alternate embodiment of a thermally insulating sleeve with first and second halves, in accordance with an embodiment of the invention.

FIG. 2B is an alternate embodiment of the insulating sleeve 121 with a first half-sleeve 123 and a second half-sleeve 125, constructed in accordance with an embodiment of the invention. The first half-sleeve 123 includes a semicircular central portion 127, surrounding about half of the discharge pipe 102, and having relatively flat first flange portions 129 on either side. Each of the two first flange portions 129 has an opening 131 to accommodate a mechanical fastener such as a screw 133.

The second half-sleeve 125 has a semicircular central portion 135, surrounding the roughly half of the discharge pipe 102 not surrounded by central portion 127, and having a second flange portion 137 on either side. Each of the second flange portions 137 has an opening 139 that aligns with the openings 131 in the first flange portions 129 of the first half-sleeve 123. Either the first flange openings 131 or the second flange openings 139 may be threaded such that the screw 133 inserted through each of the aligned openings 131, 139 can securely attach the first and second half-sleeves 123, 125 around the discharge pipe 102.

The semicircular central portion 135 also includes a protruding cavity 141 which protrudes radially outward away from the discharge pipe 102. The protruding cavity 141 houses the discharge gas temperature sensor 104. In the embodiment of FIG. 2B, the protruding cavity 141 has an opening 143 to accommodate the electrical wires 122 that connect to the discharge gas temperature sensor 104.

Figure 3:
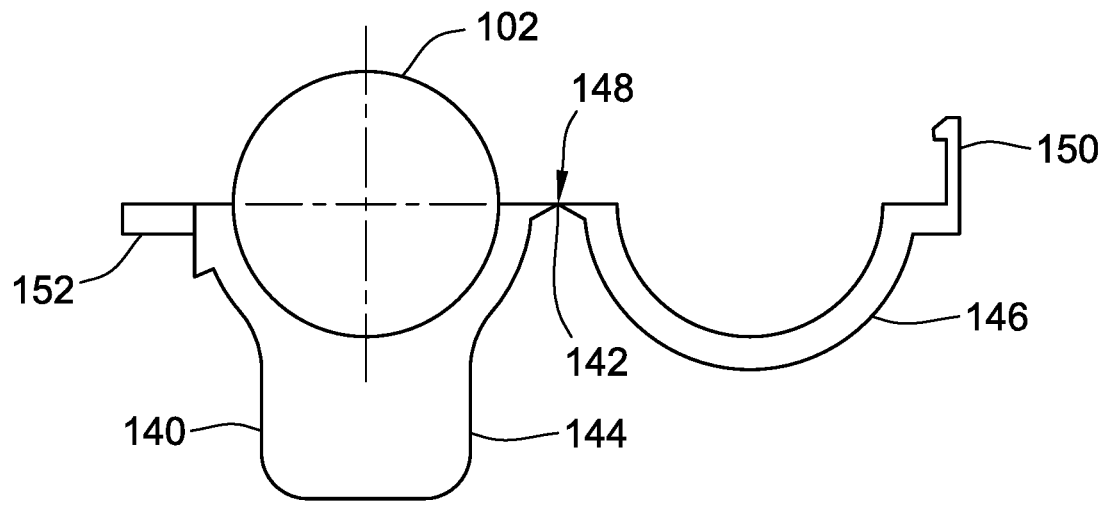
FIG. 3 is a plan view of an alternate embodiment of the thermally insulating sleeve with living hinge, in accordance with an embodiment of the invention.

FIG. 3 shows a plan view of an alternate embodiment of an insulating sleeve 140 with living hinge 148, in accordance with an embodiment of the invention. The insulating sleeve 140 has a lower portion 144 and an upper portion 146 attached at a pivot point 142 by way of the living hinge 148. The lower portion 144 has a cavity (not shown) similar to that in insulating sleeve 100, shown in FIG. 2, to hold the discharge gas temperature sensor 104 (shown in FIG. 1). However, in this embodiment, the cavity is formed in one portion of the insulating sleeve 140 rather than in two halves of the insulating sleeve.

The living hinge 148 allows the upper portion 146 to pivot about the pivot point 142 between open and closed positions. To attach the insulating sleeve 140 to the discharge pipe 102 (shown in FIG. 1), the lower portion 144 can be seated against the underside of the discharge pipe 102, and the upper portion 146 is pivoted over the top side of the discharge pipe 102. A flexible clip 150 on the upper portion 146 engages a flange 152 on the lower portion 144. A lip on the flexible clip 150 is configured to hold fast onto an edge of the flange 152.

Figure 4:
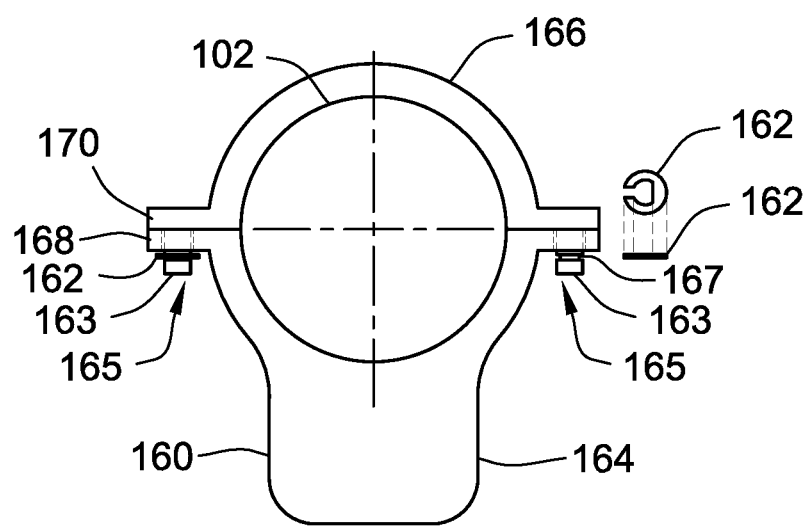
FIG. 4 is a plan view of an alternate embodiment of the insulating sleeve with E spring clip, in accordance with an embodiment of the invention.

FIG. 4 is a plan view of an alternate embodiment of the insulating sleeve 160 with "E" spring clip 162, in accordance with an embodiment of the invention. The insulating sleeve 160 includes a lower portion 164 and a separate upper portion 166. The lower portion 164 is configured to seat against the bottom half of the discharge pipe 102, while the upper portion 166 is configured to cover the top half of the discharge pipe 102. The lower portion 164 has a cavity (not shown) similar to that in insulating sleeve 100, shown in FIG. 2, to hold the discharge gas temperature sensor 104 (shown in FIG. 1). However, in this embodiment, the cavity is formed in one portion of the insulating sleeve 160 rather than in two halves of the insulating sleeve. The upper and lower portions 166, 164 are attached using the "E" spring clip 162. In the embodiment of FIG. 4, the lower portion 164 has a first flange 168, and the upper portion 166 and a second flange 170 on the upper portion.

The second flange 170 has protruding posts 163, which are inserted through clearance holes 165 in the first flange 168. The "E" spring clip 162 then clips into a slot or groove 167 encircling the post 163, thus holding the upper portion 166 tightly to the lower portion 164. In the embodiment shown, the "E" spring clips 162 have a rounded "E" shape, similar to a C-shape. The two "E" spring clips 162, in FIG. 4, fasten the insulating sleeve 160 to the discharge pipe 102. However, it is envisioned that some embodiments of the invention will use fewer or greater that two "E" spring clips 162. The "E" spring clips 162 are configured to be inserted and removed manually to install and remove the insulating sleeve 160.

Figure 5A:
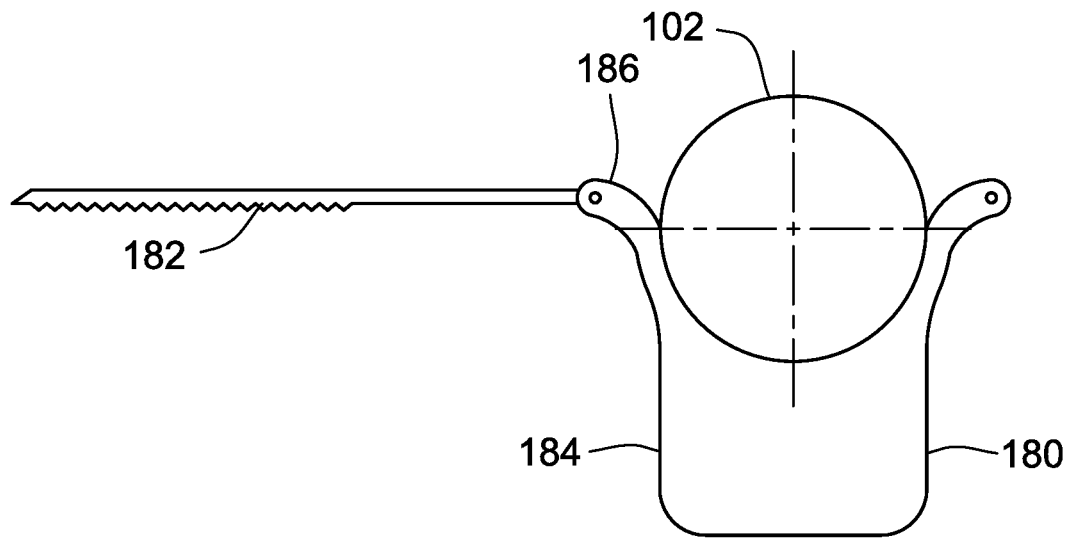
FIGS. 5A-5C are plan views of an alternate embodiments of the thermally insulating sleeve with cable strap, constructed in accordance with embodiments of the invention.
Figure 5B:
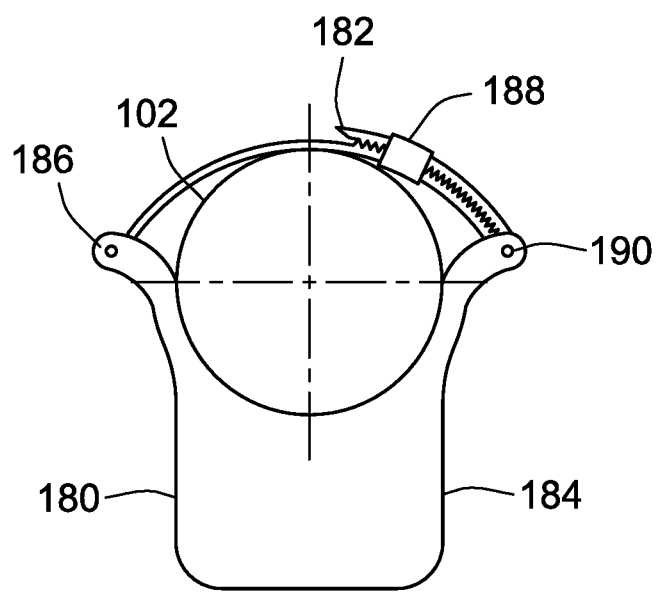

FIGS. 5A and 5B show plan views of an alternate embodiment of the insulating sleeve 180 with cable strap 182, in accordance with an embodiment of the invention. The insulating sleeve 180 includes a body portion 184 configured to seat against the underside of the discharge pipe 102. The body portion 184 has a cavity (not shown) similar to that in insulating sleeve 100, shown in FIG. 2, to hold the discharge gas temperature sensor 104 (shown in FIG. 1). However, in this embodiment, the cavity is formed in one portion of the insulating sleeve 180 rather than in two halves of the insulating sleeve. One end of the cable strap 182 is attached on one side of the body portion 184. The cable strap 182 wraps around the top portion of the discharge pipe 102. The end of the cable strap 182 is attached to a cable bar 186. The cable strap 182 is configured to wrap around the discharge pipe 102, then wrap around a second cable bar 190 and folded back upon itself. A cable buckle 188, as shown in FIG. 5B, secures the cable strap 182 in place after the wrap around the cable bar 190.

Figure 5C:
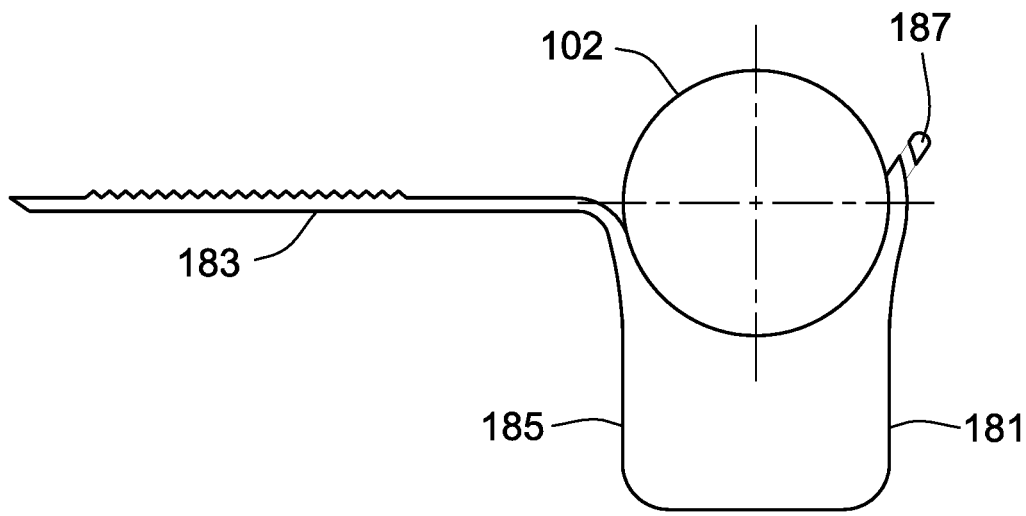

In an alternative embodiment, shown in FIG. 5C, an insulating sleeve 181 has a body portion 185 integrally molded to a cable strap 183. The integrally-molded cable strap 183 is configured to wrap around the discharge pipe 102, then wrap around a cable bar 187 and folded back upon itself. The cable buckle 188, shown in FIG. 5B, secures the cable strap 183 in place after the wrap around the cable bar 187.

Figure 6:
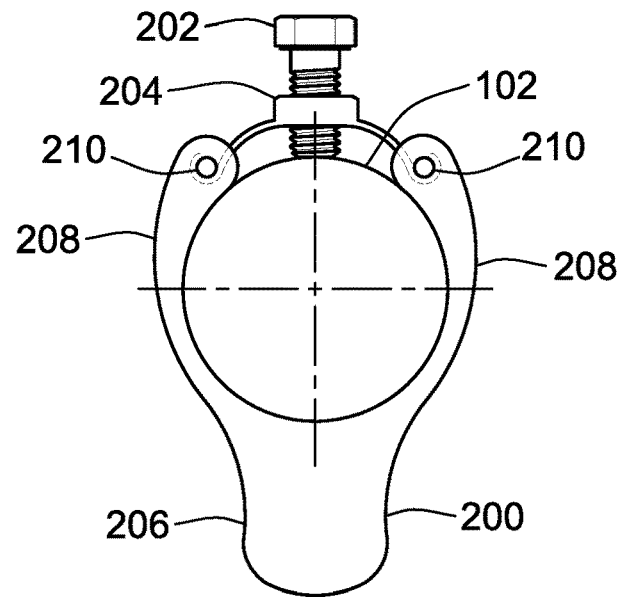
FIG. 6 is a plan view of an alternate embodiment of the thermally insulating sleeve with tension screw, in accordance with an embodiment of the invention.

FIG. 6 shows a plan view of an alternate embodiment of the insulating sleeve 200 with tension screw 202, in accordance with an embodiment of the invention. The tension screw 202 facilitates attachment of an upper portion 204 to a lower portion 206. The lower portion 206 has a cavity (not shown) similar to that in insulating sleeve 100, shown in FIG. 2, to hold the discharge gas temperature sensor 104 (shown in FIG. 1). However, in this embodiment, the cavity is formed in one portion of the insulating sleeve 200 rather than in two halves of the insulating sleeve.

In the embodiment of FIG. 6, the upper portion 204 has a threaded opening in a central part of the upper portion 204 to receive the tension screw 202. The lower portion 206 has two arms 208 configured to surround a portion of the discharge pipe 102, and that typically extend to opposite sides of the compressor discharge pipe 102. At the end of each arm 208 is a pin 210. The ends of the upper portion 204 are curved and configured to fit around the pins 210. When the tension screw 202 is screwed into the threaded opening in the upper portion 204, the end of the tension screw 202 abuts on the outer surface of the discharge pipe 102. Thus, when the tension screw 202 is rotated the upper portion 204 rides up or down the tension screw 202 depending on the direction the tension screw 202 is rotated. When the tension screw 202 is rotated to raise the upper portion 204, the curved ends of the upper portion tighten around the pins 210. Rotation of the tension screw 202 in the opposite direction can lower the upper portion 204 to allow for detachment from the lower portion 206.

Figure 7:
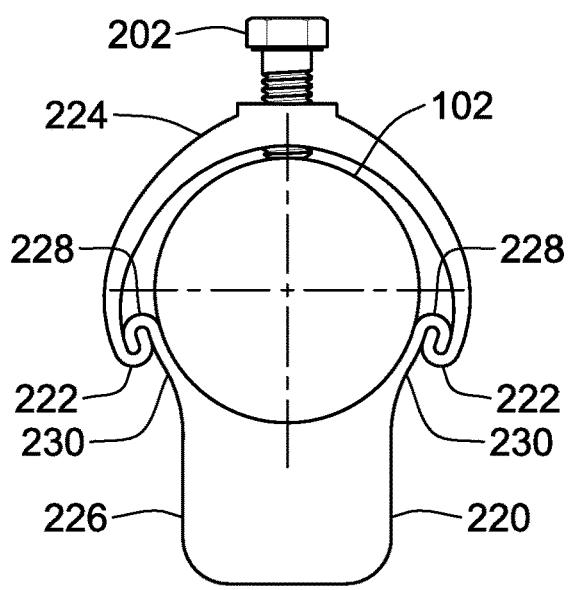
FIG. 7 is a plan view of an alternate embodiment of the thermally insulating sleeve with tension screw with hook clip, in accordance with an embodiment of the invention.

FIG. 7 shows a plan view of an alternate embodiment of the insulating sleeve 220 with the tension screw 202 and hook clips 222, in accordance with an embodiment of the invention. As in the embodiment of FIG. 6, the tension screw 202 in this embodiment facilitates attachment of the insulating sleeve 220 to the discharge pipe 102. The lower portion 226 has a cavity (not shown) similar to that in insulating sleeve 100, shown in FIG. 2, to hold the discharge gas temperature sensor 104 (shown in FIG. 1). However, in this embodiment, the cavity is formed in one portion of the insulating sleeve 220 rather than in two halves of the insulating sleeve.

In the embodiment of FIG. 7, the upper portion 224 has a threaded opening in a central part of the upper portion 224 to receive the tension screw 202. At each end of the upper portion 224, there is a hook-shaped hook clip 222. The lower portion 226 has two arms 230 with two hooked ends 228, the two arms 230 extending to opposite sides of the compressor discharge pipe 102. The hooked ends 228 are configured to interlock with the hook clips 222. When the tension screw 202 is screwed into the threaded opening in the upper portion 224, the end of the tension screw 202 abuts on the outer surface of the discharge pipe 102. Thus, when the tension screw 202 is rotated the upper portion 224 rides up or down the tension screw 202 depending on the direction the tension screw 202 is rotated. When the tension screw 202 is rotated to raise the upper portion 224, the hook clips 222 of the upper portion 224 tighten against the hooked ends 228 of the lower portion 226. Rotation of the tension screw 202 in the opposite direction lowers the upper portion 224 for detachment from the lower portion 226.

Figure 8:
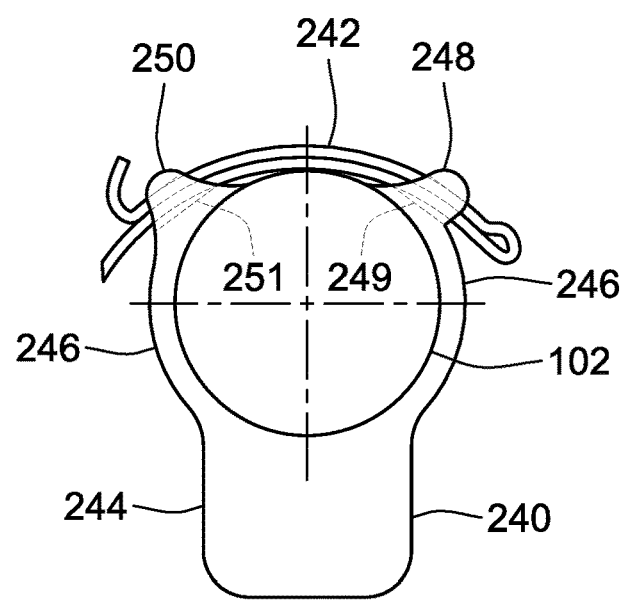
FIG. 8 is a plan view of an alternate embodiment of the thermally insulating sleeve with cotter pin, in accordance with an embodiment of the invention.

FIG. 8 shows a plan view of an alternate embodiment of the insulating sleeve 240 with cotter pin 242, in accordance with an embodiment of the invention. The insulating sleeve 240 includes a lower body portion 244 with two arms 246 that extend to opposite sides of the compressor discharge pipe 102. The lower portion 244 has a cavity (not shown) similar to that in insulating sleeve 100, shown in FIG. 2, to hold the discharge gas temperature sensor 104 (shown in FIG. 1). However, in this embodiment, the cavity is formed in one portion of the insulating sleeve 240 rather than in two halves of the insulating sleeve. At the end of one of the two arms 246, there is a first attachment point 248 with a first hole 249 through which the cotter pin 242 is inserted. At the end of the other of the two arms 246, there is a second attachment point 250 with a second hole 251 through which the cotter pin 242 is secondarily inserted and bent to secure the other end of the cotter pin 242, and thereby secure the insulating sleeve 240 to the discharge pipe 102.

Figure 9A:
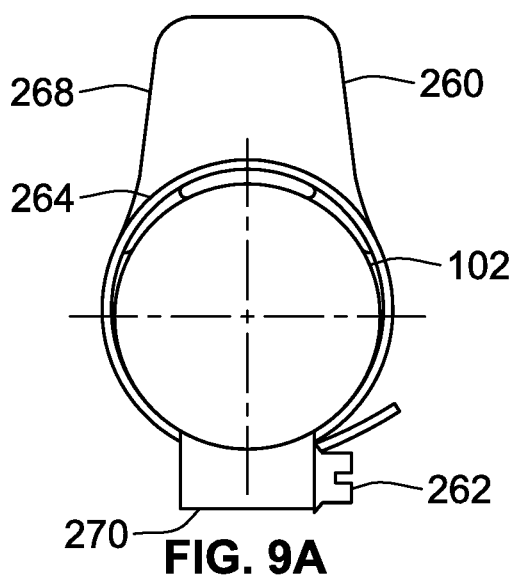
FIGS. 9A and 9B are plan views of two configurations of the thermally insulating sleeve with a pipe clamp, in accordance with an embodiment of the invention.
Figure 9B:
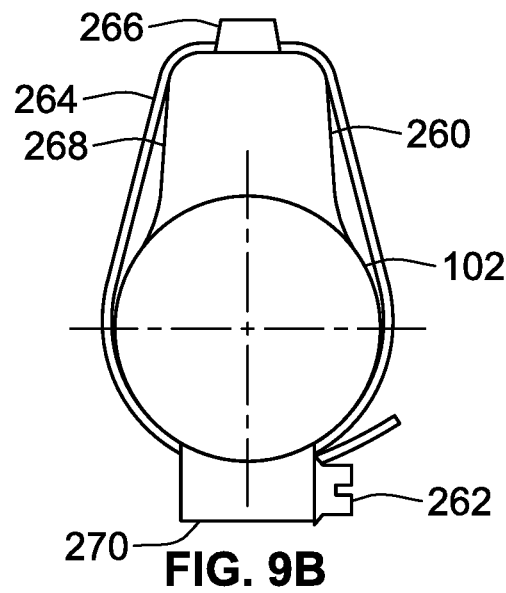

FIGS. 9A and 9B show plan views of an alternate embodiment of the insulating sleeve 260 with pipe clamp 262, in accordance with an embodiment of the invention. The insulating sleeve 260 has a body portion 268, which is configured to seat against the discharge pipe 102, and is held firmly in place by a band 264 that is tightened or loosened via the pipe clamp 262. The band 264 may be made from metal, though non-metal embodiments are envisioned, and has features that interface with the threads of the screw such that the band can be tightened or loosened by rotation of the screw. The body portion 268 has a cavity (not shown) similar to that in insulating sleeve 100, shown in FIG. 2, to hold the discharge gas temperature sensor 104 (shown in FIG. 1). However, in this embodiment, the cavity is formed in one portion of the insulating sleeve 260 rather than in two halves of the insulating sleeve.

In the embodiment of FIG. 9A, the band 264 encircles the discharge pipe 102 securing the insulating sleeve 260 to the discharge pipe 102. In this embodiment, the insulating sleeve 260 includes an opening (not shown) for the band 264. Alternately, the insulating sleeve 260 could include a curved flange to engage discharge pipe 102, such that the band 264 encircles both the discharge pipe 102 and the curved flange to secure the insulating sleeve 260 to the discharge pipe 102.

In the embodiment of FIG. 9B, there is a spacer 266 with an opening through which the band 264 passes. The spacer 266 is disposed on an end of the body portion 268 opposite the end seated against the discharge pipe 102. This prevents the band 264 from damaging the body portion 268. A screw assembly 270 is attached to the band 264 and located on a side of the discharge pipe 102 opposite the body portion 268. The screw in the screw assembly 270 is rotated to tighten or loosen the band 264 around the discharge pipe 102. Alternatively, the spacer 266 may be shaped such that band 264 passes over the spacer 266 rather than through it.

Figure 10:
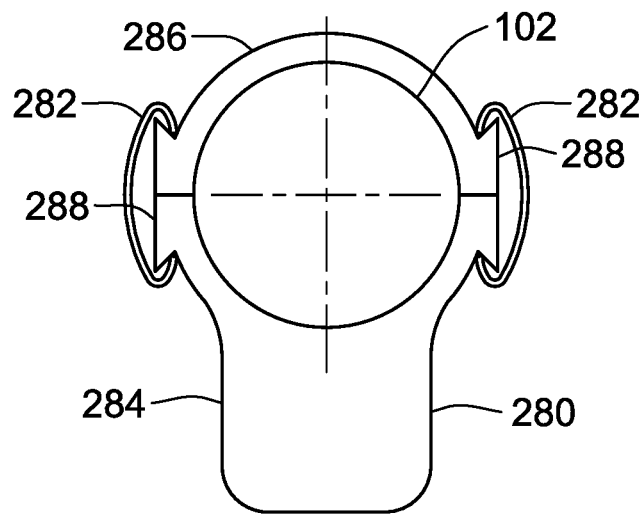
FIG. 10 is a plan view of an alternate embodiment of the thermally insulating sleeve with push on clips, in accordance with an embodiment of the invention.

FIG. 10 shows a plan view of an alternate embodiment of the insulating sleeve 280 with push on clips 282, in accordance with an embodiment of the invention. The insulating sleeve 280 includes a lower portion 284 and a separate upper portion 286. The lower portion 284 is configured to seat against the bottom half of the discharge pipe 102, while the upper portion 286 is configured to cover the top half of the discharge pipe 102. The upper and lower portions 286, 284 are attached using the push on clips 282. In the embodiment of FIG. 10, the push-on clips 282 are C-shaped, the curved ends of the push-on clips 282 configured to slide onto mating flanges 288 on the upper and lower portions 286, 284 creating a snug fit between the mating flanges 288 and push on clips 282 securely holding both portions together. In the embodiment shown, only two push on clips 282 are needed to fasten the insulating sleeve 280 to the discharge pipe 102. However, it is envisioned that some embodiments of the invention will use fewer or greater than two push-on clips 282. The push-on clips 282 are configured to be assembled and removed manually to install and remove the insulating sleeve 280.

Figure 11:
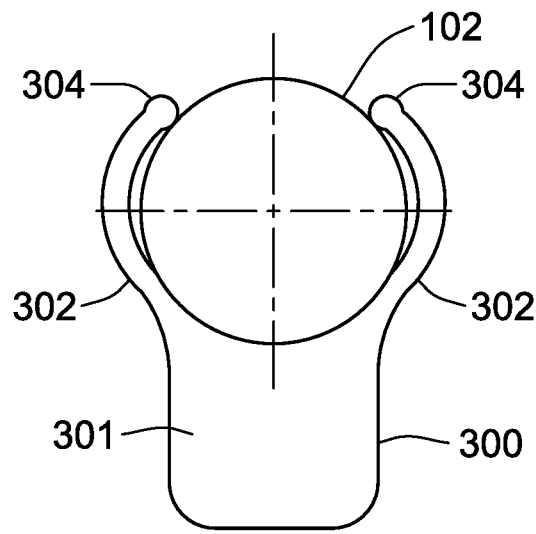
FIG. 11 is a plan view of an alternate embodiment of the thermally insulating sleeve having a one-piece snap on design, in accordance with an embodiment of the invention.

FIG. 11 is a plan view of an alternate embodiment of the insulating sleeve 300 having a one-piece snap-on design. The insulating sleeve 300 includes a body portion 301 and pair of resilient flexible curved arms 302 where, as shown in FIG. 11, the two arms 302 extend from opposite sides of the body portion 301. In a particular embodiment, each of the two resilient flexible arms 302 has a rounded end 304. The discharge pipe 102 is held in place by the resilient flexible curved arms 302. As can be seen in FIG. 11, in the normal position, the distance separating the rounded ends 304 is less than the diameter of the discharge pipe 102. During insertion of the discharge pipe 102 into the insulating sleeve 300, the discharge pipe 102 is pressed down against the rounded ends 304 causing the resilient flexible curved arms 302 to widen until the separation of the two ends 304 is sufficient (i.e., greater than the diameter of the discharge pipe 102) to allow for insertion of the discharge pipe 102. This effectively allows the insulating sleeve 300 to "snap on" to the compressor discharge pipe 102. To effect removal of the discharge pipe 102, the above-described steps are effectively performed in reverse. After insertion (or removal), the resilient flexible curved arms 302 return nearly to their normal position, but remain bent enough by the pipe 102 so as to clamp the sleeve 300 to the pipe 102. This nearly-normal position results in the two resilient flexible curved arms 302 partially encircling the discharge pipe 102 so as to securely retain the discharge pipe 102 within the insulating sleeve 300.

Some embodiments of the insulating sleeve are shown with a split assembly, such that the assembly is parted through the cavity for the sensor (such as in FIGS. 1 and 2), while other embodiments are shown with the assembly parted such that the sensor cavity is entirely within one portion (such as in FIGS. 3 and 4). Most embodiments of the invention can be achieved with multiple parting configurations. It will be recognized by those of ordinary skill in the art that the scope of the present invention encompasses all of the embodiments disclosed herein as including any of the parting configurations shown herein.

Further, terms such as "upper" and "lower", as used herein are not meant to restrict the orientation of the sensor and insulating sleeve. In fact, it may be desirable in certain applications to orient the assembly in such a fashion that the embodiments shown herein, primarily with the sensor installed on the "bottom" of the discharge pipe, are inverted, placing the sensor at the top of the discharge pipe, or even on the side or at some non-orthogonal position. All such configurations are considered to be within the scope of the present invention.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A thermally insulating sleeve for a compressor discharge pipe, the insulating sleeve comprising:
    a non-metallic first half-sleeve having a first curved body portion and a first extended portion, wherein the first curved body portion is configured to fit at least partially around a portion of the compressor discharge pipe;
    a non-metallic second half-sleeve having a second curved body portion configured to attach to the first curved body portion such that the first and second curved body portions completely encircle the portion of the compressor discharge pipe, the non-metallic second half-sleeve including a second extended portion configured to attach to the first extended portion, each of the first and second extended portions including respective first and second cavities which, together, encase a temperature sensor on all sides except for a side that is in contact with, or in spaced relation to, the compressor discharge pipe.

2. The thermally insulating sleeve of claim 1, wherein the first and second half-sleeves are each constructed from molded plastic.

3. The thermally insulating sleeve of claim 1, wherein the first and second half-sleeves are attached using one or more mechanical fasteners.

4. The thermally insulating sleeve of claim 3, wherein the one or more mechanical fasteners includes a threaded screw.

5. The thermally insulating sleeve of claim 3, wherein the first and second half-sleeves are attached at a first end of the first and second half-sleeves proximate the first and second curved body portions, and attached at a second end of the first and second half-sleeves proximate the first and second extended portions.

6. The thermally insulating sleeve of claim 1, wherein at least one of the first and second extended portions includes at least a partial opening for a wire connected to the temperature sensor, the at least partial opening providing a path from its respective cavity to an exterior of the first or second half-sleeve.

7. A thermally insulating sleeve for a compressor discharge pipe, the insulating sleeve comprising:
   a non-metallic second body portion configured to fit at least partially around a first segment of the compressor discharge pipe;
   a non-metallic first portion configured to fit at least partially around a second segment of the compressor discharge pipe different from the first segment of the compressor discharge pipe;
   wherein the first portion is further configured to be removably attached to the second body portion to secure the insulating sleeve to the discharge pipe such that the second body portion and first portion completely encircle a portion of the compressor discharge pipe, the second body portion including an extended portion with a cavity configured to encase a temperature sensor on all sides except for a side that is in contact with, or in spaced relation to, the compressor discharge pipe.

8. The thermally insulating sleeve of claim 7, wherein the first portion and second body portion are removably attached at a connection point, and are fixedly attached at a pivot point such that the first portion pivots about the pivot point between an open position, in which the insulating sleeve can be attached or removed from the discharge pipe, and a closed position in which the first portion and second body portion are fastened to the compressor discharge pipe.

9. The thermally insulating sleeve of claim 8, wherein the first portion includes a flexible clip that engages a flange on the second body portion to secure the first portion to the second body portion at the connection point when in the closed position.

10. The thermally insulating sleeve of claim 9, wherein the flexible clip has a lip configured to hold onto an edge of the flange.

11. The insulating thermally sleeve of claim 7, wherein the first portion is a separate member from the second body portion, the first portion and second body portion configured to be attached via one or more push-on clips.

12. The insulating thermally sleeve of claim 11, wherein at least one of the one or more push on clips is configured to slide over mating flanges of the first portion and second body portion.

13. The thermally insulating sleeve of claim 7, wherein the extended portion includes an opening for a wire connected to the temperature sensor, wherein the opening provides a path from the cavity to an exterior of the second body portion.

14. The thermally insulating sleeve of claim 7, wherein the cavity is disposed wholly in the second body portion and extends radially outward from the compressor discharge pipe when the thermally insulating sleeve is attached to the compressor discharge pipe.

15. A thermally insulating sleeve for a compressor discharge pipe, the insulating sleeve comprising:
   a non-metallic body portion configured to fit at least partially around a segment of the compressor discharge pipe, the non-metallic body portion having a first resilient flexible curved arm and a second resilient flexible curved arm, the first and second arms extending from opposite sides of the non-metallic body portion, the first resilient flexible curved arm having a first end, the second resilient flexible curved arm having a second end, the first and second resilient flexible curved arm having a normal position in which the first and second ends are separated by a distance that is less than a diameter of the compressor discharge pipe;
   wherein the first and second resilient flexible curved arms are configured to bend so that the distance between the first and second ends is greater than the diameter of the compressor discharge pipe to facilitate insertion or removal of the compressor discharge pipe from the insulating sleeve; and
   wherein, after the insertion or removal of the compressor discharge pipe, the first and second resilient flexible curved arms return to the normal position.

16. The thermally insulating sleeve of claim 15, wherein at least one of the first and second ends are rounded.

17. A thermally insulating sleeve for a compressor discharge pipe, the insulating sleeve consisting of:
   a non-metallic second body portion configured to fit at least partially around a first segment of the compressor discharge pipe;
   a non-metallic first portion configured to fit at least partially around a second segment of the compressor discharge pipe different from the first segment of the compressor discharge pipe;
   wherein the first portion is further configured to be removably attached to the second body portion to secure the insulating sleeve to the discharge pipe such that the second body portion and first portion completely encircle a portion of the compressor discharge pipe, the second body portion including an extended portion with a cavity configured to encase a temperature sensor on all sides except for a side that is in contact with, or in spaced relation to, the compressor discharge pipe.

18. The thermally insulating sleeve of claim 17, wherein the first portion and second body portion are removably attached at a connection point, and are fixedly attached at a pivot point such that the first portion pivots about the pivot point between an open position, in which the insulating sleeve can be attached or removed from the discharge pipe, and a closed position in which the first portion and second body portion are fastened to the compressor discharge pipe.

19. The thermally insulating sleeve of claim 18, wherein the first portion includes a flexible clip that engages a flange on the second body portion to secure the first portion to the second body portion at the connection point when in the closed position.

20. The thermally insulating sleeve of claim 19, wherein the flexible clip has a lip configured to hold onto an edge of the flange.

21. The thermally insulating sleeve of claim 17, wherein the cavity is disposed wholly in the second body portion and extends radially outward from the compressor discharge pipe when the thermally insulating sleeve is attached to the compressor discharge pipe.

22. The thermally insulating sleeve of claim 17, wherein the extended portion includes an opening for a wire connected to the temperature sensor, wherein the opening provides a path from the cavity to an exterior of the second body portion.

* * * * *